US007121382B2

(12) United States Patent
Jackson

(10) Patent No.: US 7,121,382 B2
(45) Date of Patent: Oct. 17, 2006

(54) INDEPENDENTLY ADJUSTABLE EXTENSIONS LEVELING A LADDER

(76) Inventor: Elizabeth Jackson, 173 Black Mountain Rd., Cullowhee, NC (US) 28723

( * ) Notice: Subject to any disclaimer, the term of this patent is extended or adjusted under 35 U.S.C. 154(b) by 0 days.

(21) Appl. No.: 10/959,877

(22) Filed: Oct. 7, 2004

(65) Prior Publication Data

US 2006/0076192 A1 Apr. 13, 2006

(51) Int. Cl.
*E06C 1/00* (2006.01)
*E06C 7/00* (2006.01)
*F16B 21/00* (2006.01)

(52) U.S. Cl. ....................... 182/204; 182/201; 411/347

(58) Field of Classification Search ................ 182/200, 182/201, 204, 202, 107, 203, 205, 214; 248/188.2, 248/188.5; 411/348, 508, 21, 22, 347, 509, 411/510; 24/457, 458, 326, 356, 106
See application file for complete search history.

(56) References Cited

U.S. PATENT DOCUMENTS 3,097,559 A * 7/1963 Chapman .................... 411/348
3,414,082 A 12/1968 Gilland
3,937,298 A 2/1976 Hurwitz
3,948,352 A 4/1976 Larson et al.
4,143,742 A 3/1979 Fernandez
4,606,432 A 8/1986 Belt
4,671,383 A 6/1987 Huang
5,305,851 A 4/1994 Katson et al.
5,307,900 A * 5/1994 Noga ......................... 182/204
5,476,153 A 12/1995 Dickerson et al.
5,497,850 A * 3/1996 Patterson .................... 182/204
5,853,065 A * 12/1998 Hutson et al. ................ 182/18
5,908,085 A 6/1999 Lovelady
6,012,546 A * 1/2000 Bee et al. ................... 182/107
6,073,726 A 6/2000 McCrystal
6,478,113 B1 * 11/2002 Ellison ....................... 182/204
6,779,632 B1 * 8/2004 Parks, III .................... 182/204

* cited by examiner

*Primary Examiner*—Hugh B. Thompson, II
(74) *Attorney, Agent, or Firm*—Theresa M Seal

(57) ABSTRACT

Independently adjustable ladder extensions for use with folding, step, or extension ladders includes at least one pair of ladder extensions with each ladder extension including an adjustable leg disposed within and encompassed by the lower end of the ladder side rail and having apertures that align with through holes of the side rail so that the leg can be slidably adjusted within the side rail and then locked in the desired position for stabilizing and leveling the ladder on an uneven surface. A locking pin inserts into the through holes of the side rail and through the apertures of the leg for locking the adjustable leg in the desired position, and the locking pin includes a flap member for holding the locking pin on the side rail. A traction foot is pivotally mounted to the bottom of each adjustable leg to facilitate the stabilization of the ladder on the uneven surface.

1 Claim, 4 Drawing Sheets

INDEPENDENTLY ADJUSTABLE EXTENSIONS LEVELING A LADDER

FIELD OF THE INVENTION

The present invention pertains to ladder accessories and attachments for safely deploying a ladder, and more particularly pertains to independently adjustable extensions for leveling a ladder on sloping, uneven or irregular surfaces.

BACKGROUND OF THE INVENTION

One of the most common pieces of equipment for both household and work use is the ladder in its several embodiments: the extension ladder and the stepladder. Such ladders are used for tasks as diverse as painting, cleaning aluminum siding, cleaning gutters, changing lights and cleaning ceiling fans and stocking shelves. Since the work sites where such ladders are used are often irregular, uneven or sloping, care must be taken in properly setting up and deploying the ladders. Obviously placing a ladder on an uneven or irregular surface decreases the stability of the ladder; and this instability increases with the height or vertical extension of the ladder. Moreover, with the current issues of worker's compensation and personal injury liability, the improper deployment of a ladder by an employee can result in a physical injury for the employee and the possibility of legal damages and penalties against the employer for improper supervision of the work site.

Thus, in order to stabilize a ladder on an uneven or irregular surface the homeowner and employee resort to several common expedients. One expedient is to simply find a handy and available rock to wedge under the lowermost end of one of the side rails of the ladder to balance and level the ladder. Another expedient is to use shims, spacers or boards to level the ladder. However, in both cases the leveling is rough and approximate, and if the ladders needs repositioned, the leveling process must be undertaken anew. In addition, there is also an initial investment of time in searching for such spacers and levelers. And perhaps most importantly, such shims and spacers are not secured to the lower end of the ladder side rails, with the possibility of the ladder slipping off the shim or spacer with the individual falling off the ladder and sustaining serious injury.

The prior art discloses a wide variety of attachments and accessories for leveling and stabilizing ladders 9 on uneven and irregular terrain, surfaces and ground.

The Gilland patent (U.S. Pat. No. 3,414,082) discloses a ladder leveling apparatus that includes extensible mounting members that are pivotally attached to the side rails of the ladder.

The Hurwitz patent (U.S. Pat. No. 3,937,298) discloses a ladder leveling attachment that includes a transverse member attachable to the lower end of the ladder side rails, with the transverse member having opposed sockets for receiving therein adjustable legs for leveling the ladder.

The Larson et al. patent (U.S. Pat. No. 3,948,352) discloses a ladder leveler for extension ladders that includes a pair of sleeves each of which encompasses the lower end of the ladder side rails and is vertically adjustable and locks into place by a spring-biased pin.

The Fernandez patent (U.S. Pat. No. 4,143,742) discloses a ladder extension that includes a pair of l-shaped members that are bolted to each ladder side rail and are vertically adjustable along the lower portion of each side rail.

The Belt patent (U.S. Pat. No. 4,606,432) discloses an adjustable ladder leg that includes adjustable legs that are attached to each side rail by a clamping member and are slidably adjustable within channels that are also mounted to the clamping members.

The Huang patent (U.S. Pat. No. 4,671,383) discloses a ladder leveler that includes a pair of interconnected adaptors with each adaptor mounted to the bottom of each side rail, and an adjustable leg affixed to the underside of each adaptor for leveling the ladder.

The Katson et al. patent (U.S. Pat. No. 5,305,851) discloses an adjustable ladder leg for both a stepladder and an extension ladder.

The Dickerson et al. patent (U.S. Pat. No. 5,476,153) discloses a ladder leveling apparatus that includes a vertical support externally mounted to the lower end of each ladder side rail with each vertical support adjustable on the side rail and locked into place by a manually operable tightening member.

The Lovelady patent (U.S. Pat. No. 5,908,085) discloses a ladder leveling system that includes a pair of bands mounted to the lower end of each ladder rail for supporting a leg extension, and the leg extensions are interconnected for adjustment therealong by a spring loaded handle that extends between the ladder rails.

The McCrystal patent (U.S. Pat. No. 6,073,726) discloses an adjustable stepladder having adjustable legs and adjustable steps affixed to at least one pair of the side rails for leveling the ladder.

Nonetheless, despite the ingenuity of the above devices, there remains a need for a ladder leveling apparatus that is easily and quickly adjustable for leveling a ladder and is not cumbersome in use or weight when added to the ladder.

SUMMARY OF THE INVENTION

The present invention comprehends independently adjustable ladder extensions for achieving the stable, safe and level disposition of a ladder on uneven, irregular, sloping or inclined surfaces. The independently adjustable ladder extensions provide for the more flexible accommodation of the ladder on all types of uneven or irregular surfaces.

The adjustable ladder extensions include at least one pair of ladder extensions with each ladder extension including a support leg for insertion within the channel of the side rail adjacent the lower end thereof so that the side rail encompasses the support leg. Each support leg includes a plurality of apertures and the apertures align with through holes on the side rail. Each support leg can be slid and adjusted within the channel of the side rail independent of the slidable movement and positioning of the other support leg for stable placement of the ladder on the uneven ground. After the desired position for each support leg is obtained, with the apertures of the support leg aligned with the through holes of the side rail, a locking pin is inserted through the side rail and the support leg for locking the support leg in that position. Pivotally mounted to at the lower end of each support leg is a traction foot for gripping the ground to facilitate the stable and secure disposition of the ladder. In order to further facilitate the level deployment of the ladder on the uneven or irregular surface, a level is integrally affixed to at least one ladder rung. The level further assists the individual in appropriately adjusting each ladder extension to obtain a level disposition of the ladder relative to the uneven or irregular surface.

It is an objective of the present invention to provide ladder extensions for a ladder that are independently adjustable for safely setting up the ladder on uneven, irregular surfaces.

It is another objective of the present invention to provide ladder extensions that are independently adjustable for leveling a ladder and are easily adjustable by only one individual without requiring the assistance of others.

It is yet another objective of the present invention to provide ladder extensions that are independently adjustable and that include an integral level affixed to at least one ladder rung of the ladder for guiding the individual during ladder adjustment so that the level disposition of the ladder can be obtained.

It is still yet another objective of the present invention to provide ladder extensions that can be quickly and easily adjusted independent of each other to ensure a stable, secure disposition of the ladder on the particular sloping, uneven or irregular ground surface.

Still yet another objective of the present invention is to provide independently adjustable ladder extensions for a ladder that obviates the need to use shims, spacers or wedges beneath the bottom ends of the side rails to level the ladder.

A still further objective of the present invention is to provide independently adjustable ladder extensions for a ladder wherein the ladder extensions can be easily and quickly locked into place when the desired position for each ladder extension is obtained, and then can be quickly unlocked for further adjustment should the ladder be repositioned at another location.

These and other objects, features and advantages will become apparent to one skilled in the art upon a perusal of the following detailed description when read in conjunction with the accompanying drawing figures.

DETAILED DESRCIPTION OF THE PREFERRED EMBODIMENT

Illustrated in FIG. 1–7 are independently adjustable ladder extensions 10 for leveling and stabilizing ladders on uneven, irregular, sloping and inclined surfaces and that eliminates the need for using wedges, shims and spacers to level the ladder. The adjustable extensions 10 can be used with various ladder designs, such as stepladders and extension ladders, so that two adjustable extensions 10 would be used with an extension ladder while four adjustable extensions 10 would be used with a typical foldout stepladder. The extensions 10 are preferably manufactured from aluminum and are independently adjustable up to 12 inches.

Figure 1:
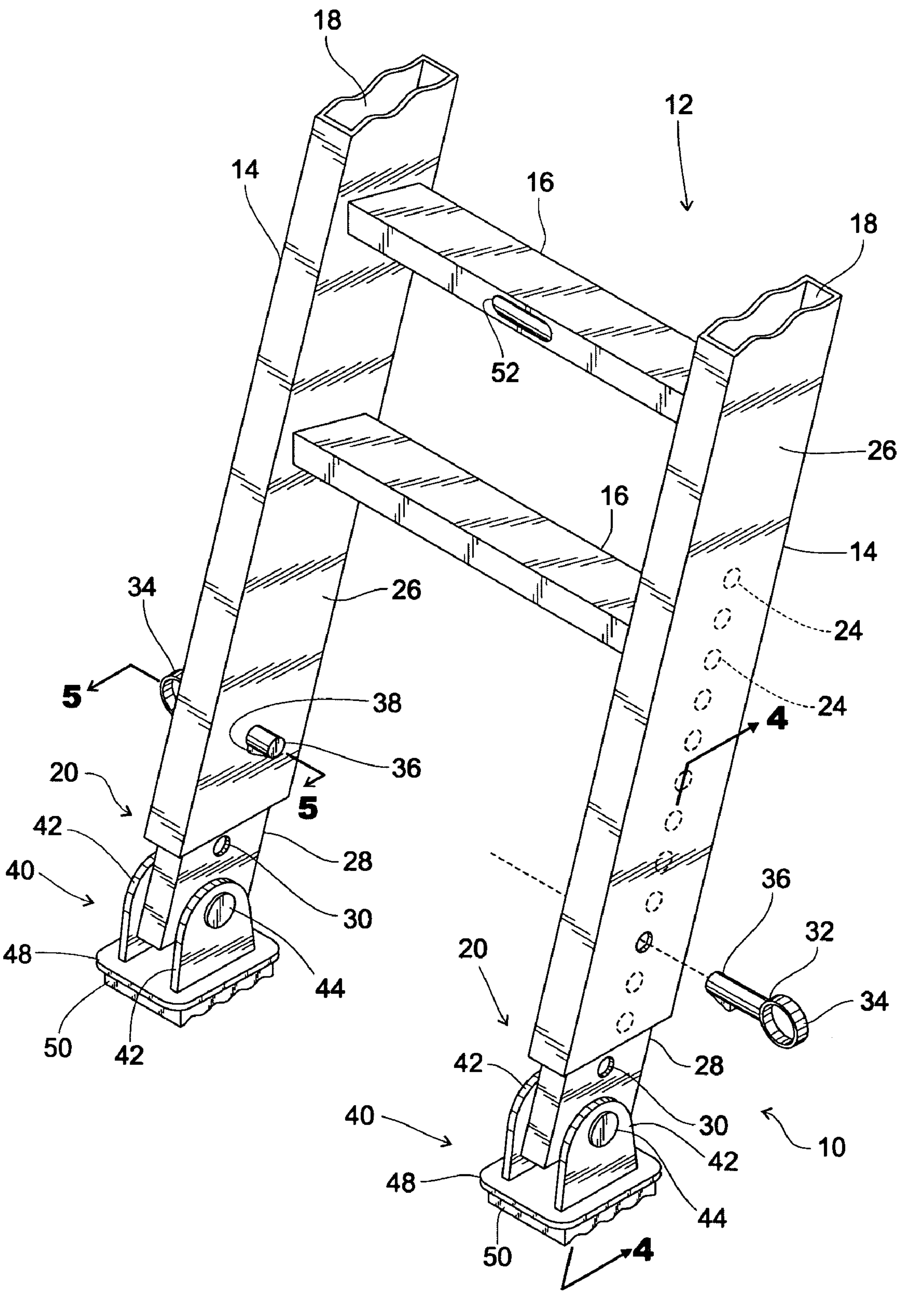
FIG. 1 is a perspective view of the independently adjustable ladder extensions of the present invention showing their mounting at the lower ends of the ladder side rails.
Figure 2:
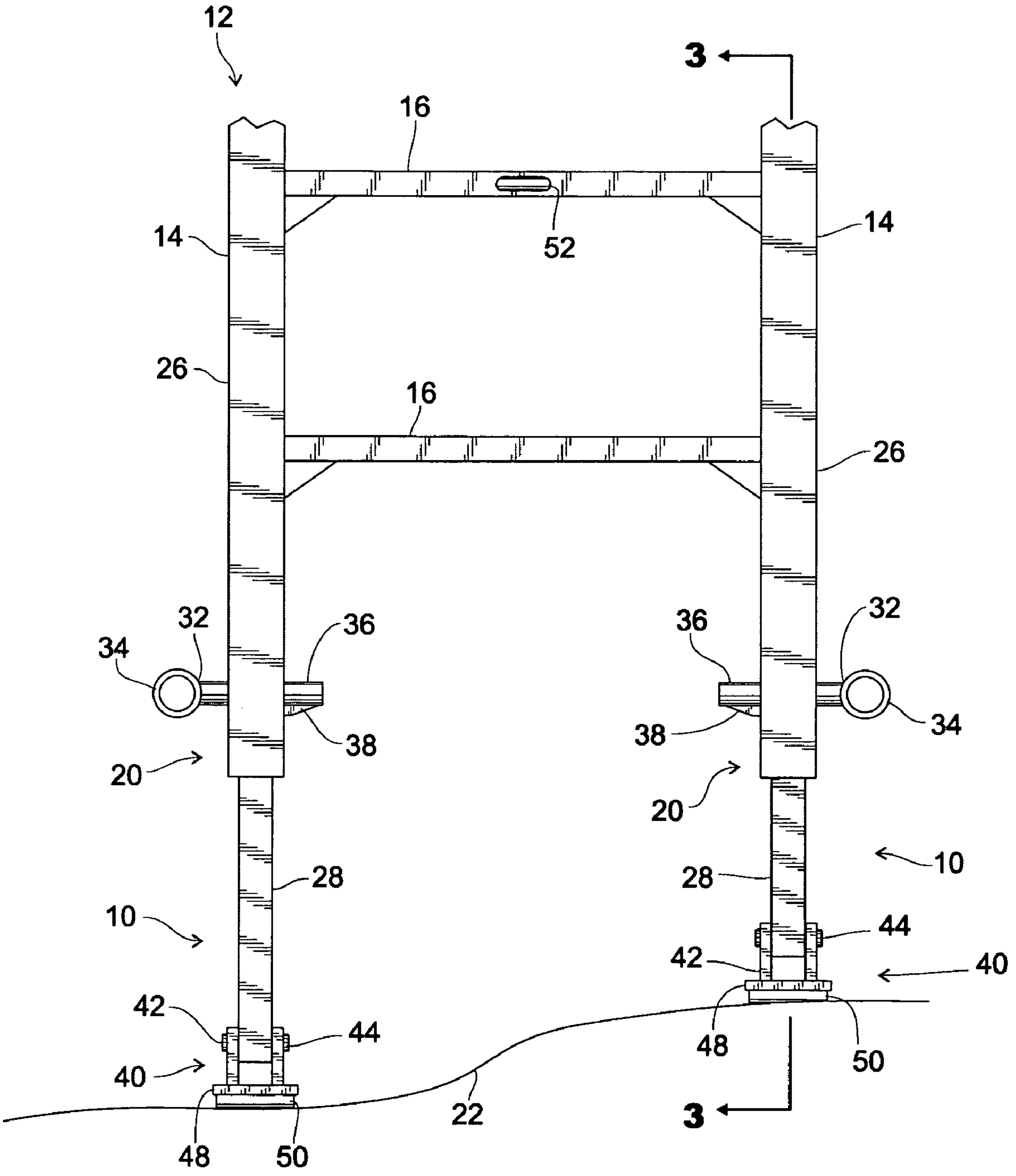
FIG. 2 is a front elevational view of the independently adjustable ladder extensions illustrating the various adjustment positions of each ladder extension for leveling the ladder on uneven ground.

Thus, with reference to FIGS. 1 and 2, the adjustable ladder extensions 10 are used with a representative extension ladder 12 that includes a pair of opposed ladder stiles or side rails 14 interconnected by several ladder rungs 16. Each side rail 14 defines and interior channel 18 that extends the length of the side rail 14, and each side rail 14 includes a bottom or lower end 20 that would normally (without the employment of the ladder extensions 10) contact and rest against the ground surface 22, such as the uneven, sloping surface of FIG. 2. Adjacent the lower end 20 of each side rail 14 is a plurality of equidistantly spaced through holes 24 that extend through each sidewall 26 of each side rail 14. Preferably the through holes 24 are spaced either three quarters of an inch or one inch apart.

Figure 3:
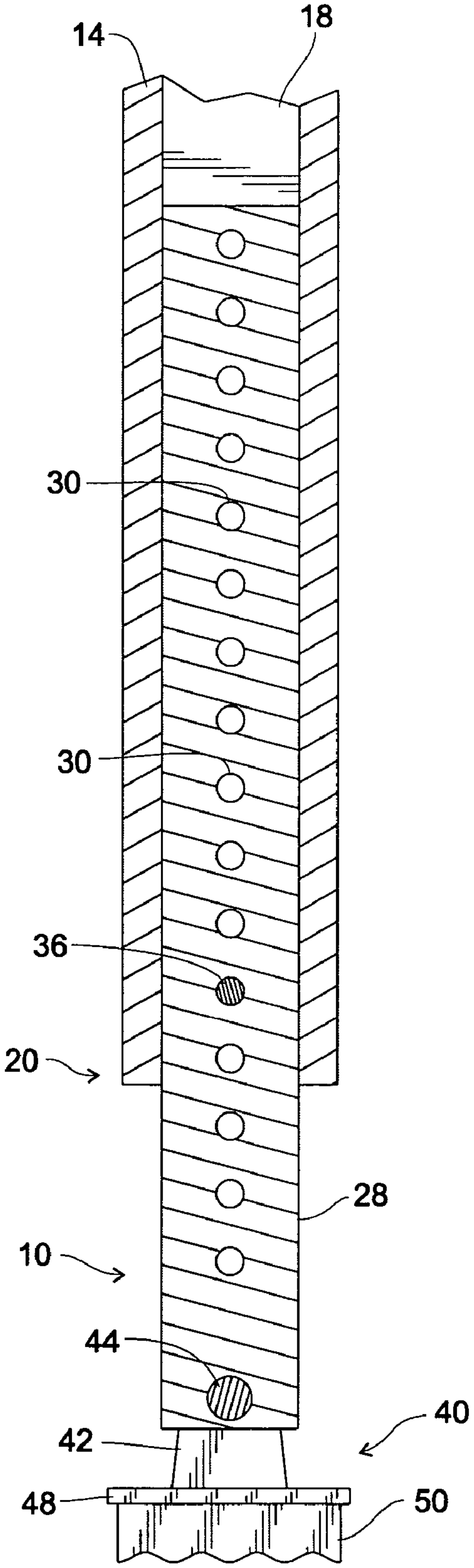
FIG. 3 is a sectioned elevational view taken along lines 3—3 of FIG. 2 of the independently adjustable ladder extensions illustrating the disposition of one ladder extension within the lower end of one ladder side rail.

As shown in FIGS. 1–4, each ladder extension 10 includes an elongated support or extension leg 28. The support legs 28 are inserted within the channels 18 of the side rails 14 and are encompassed by the side rails 14 for slidable adjustable movement therein. As shown in FIG. 3 each support leg 28 includes a plurality of apertures 30 equidistantly spaced from each other either at three quarters of an inch or one inch; this spacing provides for the alignment of the through holes 24 of the side rails 14 with the apertures 30 of the support leg 28 during the adjustment of each support leg 28. The support legs 28 are adapted for independent slidable telescopic movement up and down within the respective side rails 14 so that the appropriate height for each leg 28 can be obtained for achieving the stable and level disposition of the ladder 12 on the uneven and irregular ground surface 22.

Figure 4:
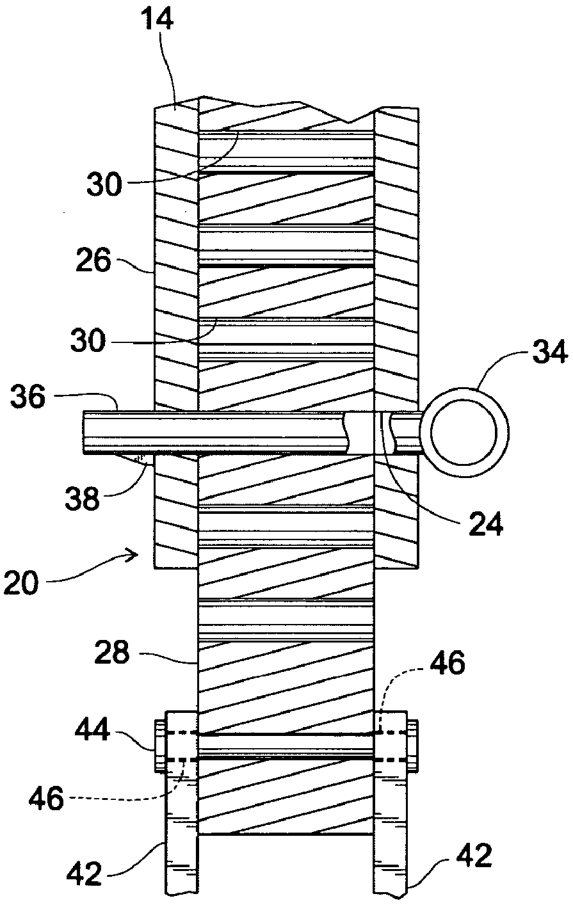
FIG. 4 is a sectioned elevational view taken along lines 4—4 of FIG. 1 of the independently adjustable ladder extensions illustrating the insertion of the locking pin through the side rail and the ladder extension for locking the ladder extension in place to the side rail.
Figure 5:
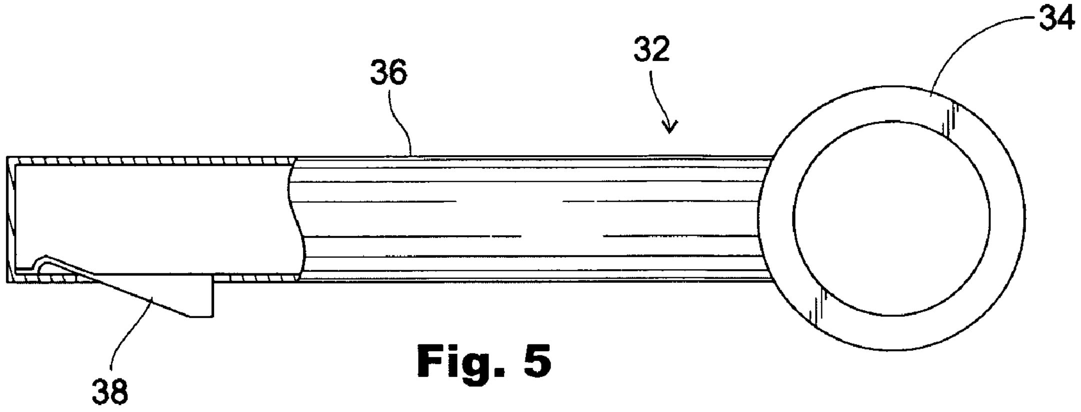
FIG. 5 is a front elevational view of the independently adjustable ladder extension illustrating the flap member of the locking pin disposed in the locking position for locking the ladder extension to the lower end of the side rail.
Figure 6:
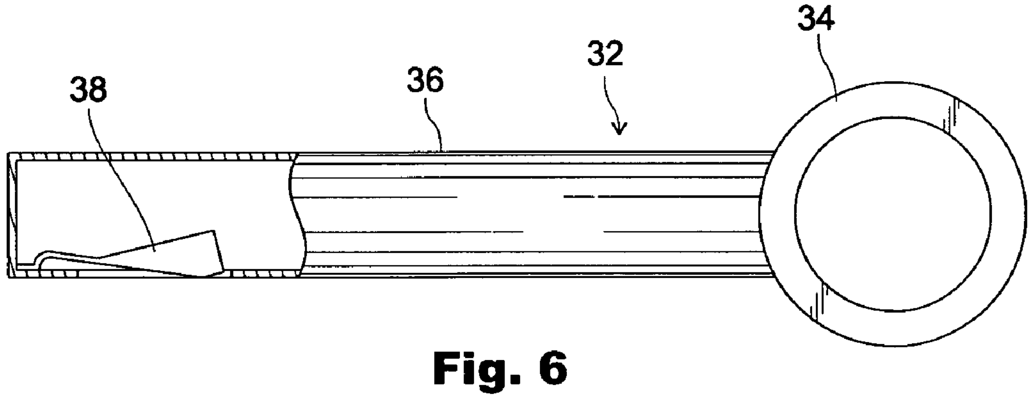
FIG. 6 is a front elevational view of the independently adjustable ladder extension illustrating the disposition of the flap member of the locking pin during the insertion or withdrawal of the locking pin to or from the side rail and the ladder extension.
Figure 7:
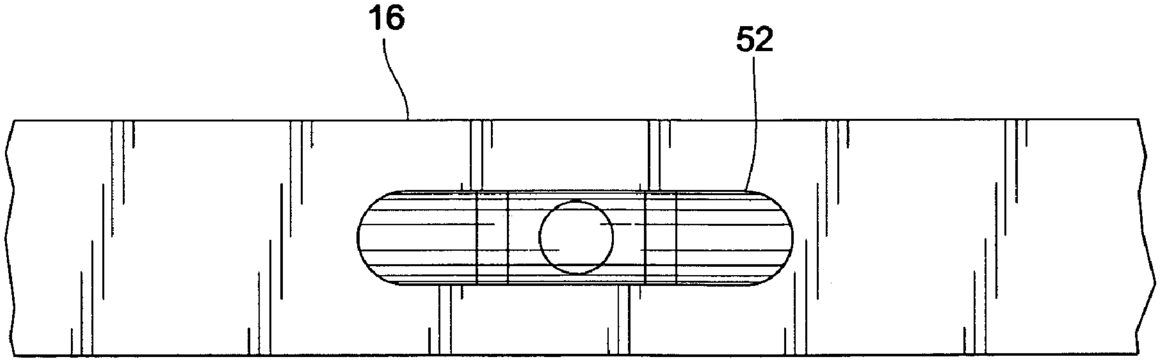
FIG. 7 is a front elevational view of the independently adjustable ladder extension illustrating a level integrally mounted to one ladder rung of the ladder.

As shown in FIGS. 1, 2 and 4–7, a locking means is used to lock the ladder extensions 10 in position after they have been slidably adjusted within the channels 18 of the side rails 14 and set at the desired height for leveling the ladder 12. The locking means includes one locking or cotter pin 32 for each ladder extension 10 as shown in FIG. 2. The locking pin 32 has a ring member 34 for manually gripping by the individual's finger and a shaft 36 having sufficient length to extend completely through the ladder extension 10 and the side rail 14. At the end of the shaft 36 is a stop or flap member 38 that can be of flexible spring steel. In order to insert the locking pin 32 through the side rail 14 and the ladder extension 10 disposed therein, the flap member 38 is bent backward so that the shaft 36 of the locking pin 32 can be cleanly inserted through the aligned aperture 30 and through hole 24; and after the shaft 36 passes through the respective through hole 24 and aperture 30, the flap member 38 can be returned to its normal position, as shown in FIGS. 1, 2 and 4, thereby preventing the accidental withdrawal of the locking pin 32 from the side rail 14. In order to purposely remove the locking pin 32, the flap member 38 is deliberately pressed against the shaft 36 so that the locking pin 32 can be withdrawn and removed from the side rail 14.

As shown in FIGS. 1–4, to insure the non-slidable disposition of the ladder 12 on the particular surface 22 after the appropriate adjustment of each ladder extension 10, pivotally mounted to the lowermost end of each support leg 28 is a surface gripping traction foot 40. Each traction foot 40 includes a pair of spaced-apart brackets 42 that abut the opposite sides of the lowermost end of the support leg 28, and a dowel or pivot pin 44 is inserted through bracket apertures 46 and the lowest aperture 30 of the support leg 28 thereby pivotally mounting the traction foot 40 to the lowermost end of the support leg 28. The brackets 42 extend upwardly from a main plate 48, and attached to the underside of the main plate 48 is a rubberized, irregular, undulating, non-skid traction pad 50.

In order to assist the individual in leveling and stabilizing the ladder 12 during the process of adjusting and positioning of the ladder extensions 10 with respect to each other and the ground surface 22, at least one level 52 is integrally affixed to one ladder rung 16. This allows the individual to use the level 52 to determine when the proper level disposition of the ladder 12 has been attained, instead of having to continually step back from the ladder 12 to visually observe the positions of the side rails 14 or the upper step of the ladder (for a foldout stepladder) to decide if the ladder 12 is properly leveled.

By way of example, for leveling the ladder 12 on the uneven ground surface 22 illustrated in FIG. 2, the individual would first slide one ladder extension 10 within the side rail 14 and then insert the locking pin 32 for locking that support leg 28 to the side rail 14. Then the other ladder extension 12 would be slidably adjusted in the other side rail 14 to the appropriate height and then locked in position by insertion of the locking pin 32. The individual would check the level 52 and then adjust one or both of the ladder extensions 10 by sliding the respective support leg 28 up or down in the side rail 14 until the appropriate height for each ladder extension 10 is found for obtaining the level and stable disposition of the ladder 12 upon the ground surface 22.

It is to be understood that the present disclosure pertains to a preferred embodiment of the invention and is for illustrative purposes only in so far as numerous modifications, alterations, and variations may be both possible and practicable to those skilled in the art without departing from the spirit of the invention or the scope of the appended claims.

I claim:

1. A pair of independently adjustable ladder extensions for use with a ladder having opposed side rails with each side rail having a channel, a plurality of through holes and a plurality of rungs interconnecting the side rails, each ladder extension, comprising:

a support leg capable of slidable adjustable movement and positioning within the respective channel and which is independent of the movement and positioning of the other support leg;

locking means for locking the support leg in position after slidable adjustment within the respective channel and for releasing the support leg so that the support leg can be readjusted and repositioned within the respective channel of the side rail;

the locking means including a pair of locking pins with each locking pin for insertion into and through the respective support leg and the side rail for locking the support leg in position and for removal therefrom so that the support leg can be adjusted and repositioned independent of the other support leg;

each locking pin including a shaft and a bendable flap member attached to the shaft so that the flap member can be pressed against the shaft for facilitating the insertion and removal of the locking pin; and whereupon after the support leg is adjusted and positioned within the channel of the side rail the flap member is pressed against the shaft to allow for the insertion of the locking pin into and through the respective side rail and support leg and then the flap member is bent away from the shaft thereby preventing the withdrawal of the locking pin from the respective support leg and side rail and locking the support leg in the desired position within the channel of the side rail.

* * * * *